(12) United States Patent
Sabie

(10) Patent No.: US 12,006,032 B2
(45) Date of Patent: Jun. 11, 2024

(54) PERSONAL FLIGHT APPARATUS WITH VERTICAL TAKE-OFF AND LANDING

(71) Applicant: Răzvan Sabie, Bucharest (RO)

(72) Inventor: Răzvan Sabie, Bucharest (RO)

( * ) Notice: Subject to any disclaimer, the term of this patent is extended or adjusted under 35 U.S.C. 154(b) by 444 days.

(21) Appl. No.: 17/048,368

(22) PCT Filed: Apr. 11, 2019

(86) PCT No.: PCT/RO2019/000011
§ 371 (c)(1),
(2) Date: Oct. 16, 2020

(87) PCT Pub. No.: WO2019/203673
PCT Pub. Date: Oct. 24, 2019

(65) Prior Publication Data
US 2021/0061456 A1 Mar. 4, 2021

(30) Foreign Application Priority Data

Apr. 17, 2018 (RO) .............................. a 2018 00268

(51) Int. Cl.
| | | |
|---|---|---|
| *B64C 29/00* | (2006.01) | |
| *B60L 50/60* | (2019.01) | |
| *B64C 21/04* | (2023.01) | |
| *B64C 25/04* | (2006.01) | |

(Continued)

(52) U.S. Cl.
CPC .......... *B64C 29/0033* (2013.01); *B60L 50/66* (2019.02); *B64C 21/04* (2013.01);
(Continued)

(58) Field of Classification Search
CPC ..... B64C 29/0033; B64C 21/04; B64C 25/04; B64C 39/08; B64C 27/24; B64C 29/00;
(Continued)

(56) References Cited

U.S. PATENT DOCUMENTS 1,362,380 A * 12/1920 Wolffsohn ............. B64D 41/00
290/36 R
3,259,343 A 7/1966 Roppel
(Continued)

FOREIGN PATENT DOCUMENTS

EP 3263456 A1 1/2018

OTHER PUBLICATIONS

International Search Report issued in connection with PCT Application No. PCT/RO2019/000011, dated Oct. 2, 2019.

*Primary Examiner* — Assres H Woldemaryam
(74) *Attorney, Agent, or Firm* — Dennemeyer & Associates LLC

(57) ABSTRACT

An apparatus is provided, allowing vertical take-off and landing. The apparatus, a biplane, has a cockpit 1attached to a wings assembly 6 by hinges 3 fixed in the supports 7 of the wings. The cockpit having a limited swing possibility within the wings' support structure. The apparatus has four propellers 9, driven by engines 20, disposed two per wing; forming a quadcopter. The apparatus being managed by a computer 17 disposed in the upper wing, and take off being made with the wings and the engines vertically oriented. The apparatus takes off as a quadcopter, and then transitions to cruise flight by reducing the angle of incidence of the wings. Meanwhile, the cockpit 1 remains in a vertical position, due to its lower center of gravity and due to joints 3, which allow it to rotate relative to the wings assembly 6 through a central open area of the lower wing. Landing is made similarly to a quadcopter.

4 Claims, 15 Drawing Sheets

(51) Int. Cl.
  *B64C 39/08* (2006.01)
  *B64D 27/18* (2006.01)
  *B64D 27/24* (2006.01)
(52) U.S. Cl.
  CPC .............. *B64C 25/04* (2013.01); *B64C 39/08* (2013.01); *B64D 27/18* (2013.01); *B64D 27/24* (2013.01); *B60L 2200/10* (2013.01)
(58) Field of Classification Search
  CPC ........... B64C 9/14; B64C 39/00; B64C 11/00; B64C 11/01; B64D 27/18
  See application file for complete search history.

(56) References Cited

U.S. PATENT DOCUMENTS

| | | |
|---|---|---|
| 5,071,088 A | 12/1991 | Betts |
| 2006/0254255 A1 | 11/2006 | Okai |
| 2010/0140416 A1* | 6/2010 | Ohanian, III ........... B64C 21/04 244/23 A |
| 2011/0042509 A1 | 2/2011 | Bevirt |
| 2011/0049304 A1* | 3/2011 | Brown .................... B64C 21/04 244/207 |
| 2011/0217163 A1* | 9/2011 | Camci ................... F04D 29/541 415/220 |
| 2013/0068876 A1* | 3/2013 | Radu ........................ B60F 5/02 244/2 |
| 2014/0097290 A1* | 4/2014 | Leng ....................... B64C 11/46 244/6 |
| 2017/0057621 A1* | 3/2017 | Evulet .................... B64C 21/00 |
| 2017/0057648 A1 | 3/2017 | Evulet |
| 2018/0002013 A1 | 1/2018 | McCullough |
| 2018/0339772 A1* | 11/2018 | McCullough ........... B64C 39/04 |
| 2018/0346108 A1* | 12/2018 | Sheng ................... B64C 21/025 |
| 2020/0317332 A1* | 10/2020 | Didey .................... B64C 39/08 |

\* cited by examiner

US 12,006,032 B2

PERSONAL FLIGHT APPARATUS WITH VERTICAL TAKE-OFF AND LANDING

CROSS-REFERENCE TO RELATED APPLICATIONS

This is a 35 U.S.C. 371 National Stage Patent Application of International Application No. PCT/RO2019/000011, filed Apr. 11, 2019, which claims priority to Romanian application a 2018 00268, filed Apr. 17, 2018, each of which is hereby incorporated by reference in its entirety.

BACKGROUND OF THE INVENTION

The invention refers to a vertical take-off and landing flight apparatus capable of carrying at least one person and flying, in carrying capacity, in a cruise mode.

During the last time, the vertical take-off and landing flight apparatus have experienced a great development because to the crowded road traffic in big cities, as well as in their surroundings, it is more than ever necessary to find some air transport solutions to replace the passenger car.

Several types of vertical take-off and landing flight apparatus are known to have advantages and disadvantages and are disclosed in patents and patent applications such as RU152807U1, U.S. Pat. No. 8,800,912B2 or WO20171584171 (A1).

The purpose of the present invention is to provide a flight apparatus suitable to the above stated requirements.

The flight apparatus with vertical take-off and landing is characterized in that it is a biplane apparatus constituted by two distinct parts articulated there between, the first distinct part consisting of the cockpit, which is hinged to the second part of the latter, which is formed of the solid support of the wings, the cockpit being attached to the wings assembly by two hinges fixed to the central vertical support pillars of the wings, the cockpit can swing inside of the wing support structure, which in turn is provided with four electric motors with ducted propellers disposed two on the top wing and two on the bottom wing forming a quadcopter assembly, the duct of each propeller being provided on the inlet lip with an annular ejection slit, and the electrical energy required for the operation of the flight apparatus is provided by battery accumulators placed under the pilot's seat, which transmit the power to the engines, the entire operation of the flight apparatus being managed by a flight computer disposed in the central part of the upper wing of the biplane and the take-off takes place with vertically oriented wings and motors, the flight apparatus lands on the ground by means of a landing gear fixed to the wings extremities, the flight apparatus taking off as a quadcopter, and the transition to the cruise is made by decreasing the angle of incidence of the wings, this angle decreasing naturally due to the increase of wing-forwarding resistance while increasing the translation speed of the flight apparatus and meanwhile, the cockpit remains in a vertical position due to its low center of gravity and the hinges that allow it to rotate in the interior of the wings assembly and the landing procedure is similar to a quadcopter, slowing down the speed leading to an increase of the angle the incidence of wings until they return to the vertical plane required for landing.

In order to make the flight more efficient, the flight apparatus can be additionally fitted both on wings and on propellers' ducts, with Coanda ejectors.

The advantages of the flight apparatus with take-off and landing according to the invention are as follows: it is capable of taking off and landing vertically, can carry a person (the concept can be extended for the transport of 4-5 persons), ensures a flight of several dozen kilometers, shows low noise, shows good energy efficiency on all flight regimes, has a high degree of safety and low size.

BRIEF DESCRIPTION OF THE DRAWINGS

The following is a detailed description of the flight apparatus according to the invention, also with reference to the FIGS. 1-17, which are.

DETAILED DESCRIPTION

Figure 1:
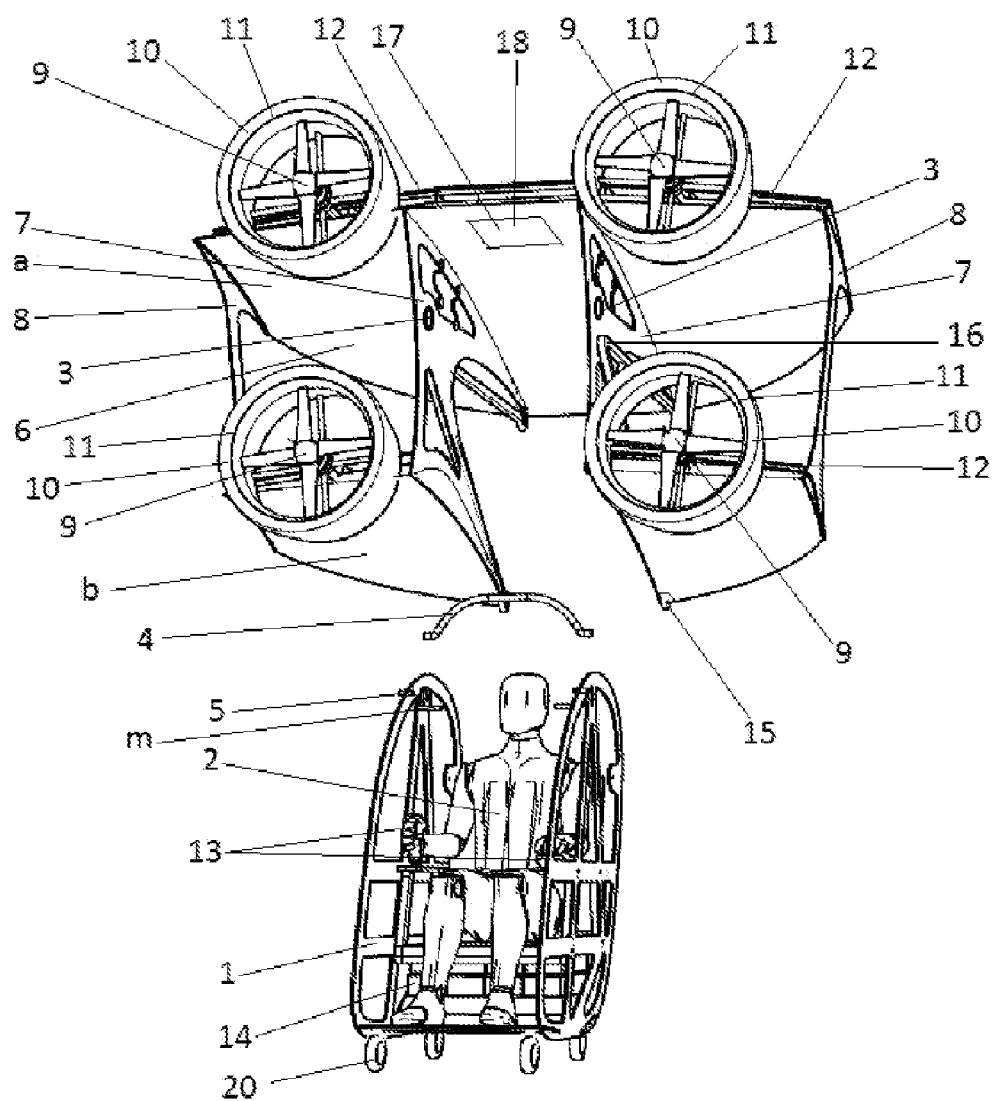
FIG. 1, an overview of the two distinct parts of the flight apparatus in the constructive variant with wing ejectors.

FIG. 1 shows the two distinct and articulated parts of the flight apparatus. The first distinct part is made up of the cockpit 1. This is made up of a rigid frame, preferably a truss to give it strength and stiffness, and which includes the flight deck which must be large enough to accommodate a comfortable position for a pilot 2. The armrests of the pilot seat incorporate the controls panels 13 on the ends. If necessary, the controls can also be ordered in the pedestrian legs or levers. The cockpit is open, but it can be partially closed by a front door with a lateral opening or can be completely closed to deviate airflow for pilot's comfort. Under the pilot's seat are the electric batteries 14, as well as the speed controllers of the motors.

The cockpit 1 has at its bottom a four-wheel assembly 20 that can rotate 360 degrees, so that the flight apparatus can be easily operated on the ground and with the wings in the position for cruise flight. On the lateral structures of the cockpit 1, is disposed a stopper bolt 5 which has the role of limiting the swing of the cockpit within the wings assembly during the cruise flight and it coming into contact with the wings assembly and, from a certain angle of the wings' incidence, to make that the two distinct parts of the apparatus to move jointly together. The cockpit 1 which constitutes the second distinct part of the apparatus is attached to the wings assembly 6, by means of the bar 4 which enter through common holes both of the cockpit 1 and of the wings assembly 6, thus forming the joints 3. In order to prevent uncontrolled swinging of the cockpit 1 due to its inertia, the joints 3 will have a controlled friction, allowing a smooth balancing of the cockpit to maintain its verticality to the ground but, without allowing its uncontrolled pivoting. The joints 3 are provided on both sides of the pilot 2 with a lever m, which by means of some gears, allows the pilot to manually adjust the wings angle when the pilot wishes or considers that is necessary for a particular maneuver.

The second distinct part of the flight apparatus is the wings assembly 6 which consists of two wings a and b having a high lift airfoil, forming a biplane assembly, with the upper wing a disposed more advanced than the lower wing b. The assembly is stiffened by two central vertical supports 7 which also have the role of supporting the cockpit and by two lateral vertical supports 8 that join the ends of the wings. The wings assembly can also be reinforced with spikes (wires). The wings have embedded in them the landing gear 15. The airfoil must generate high lift at low speeds and at high angles of incidence, and the drag must be low. In this regard, it is preferable to use the profiles described in patent no. EP0772731B1. In the central area of the upper wing, are disposed the flight computer 17 and the survival parachute 18 of the apparatus. The two wings are provided with four electric ducted propellers 9, two for each wing, and they are arranged symmetrically with respect to the vertical axis of symmetry in a quadcopter specific manner. For reasons of efficiency, noise and safety the propellers are fitted with ducts 10. For greater take-off efficiency, in order to increase the volume of the air intake, the lips of the propellers' ducts 10 will be provided with ejection slits 11.

Also, in order to increase the mass of air absorbed during the take-off and during the transition phase, the wings may be provided alongside them with bi-dimensional Coanda type ejectors 12.

Figure 2:
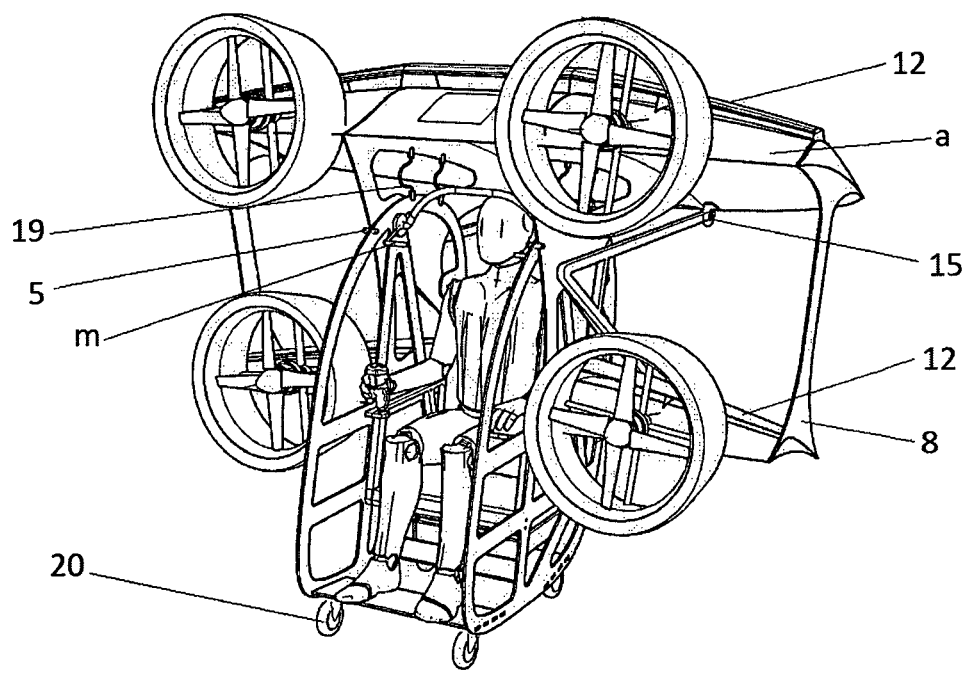
FIG. 2, overview of the flight apparatus in cruise mode.
Figure 3:
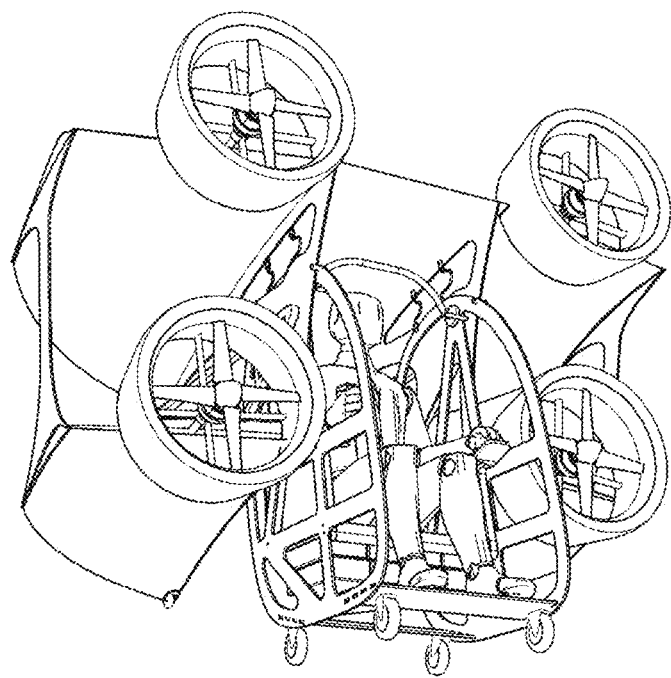
FIG. 3, a general view of a flight apparatus in the construction version without wing ejectors on cruise position.
Figure 4:
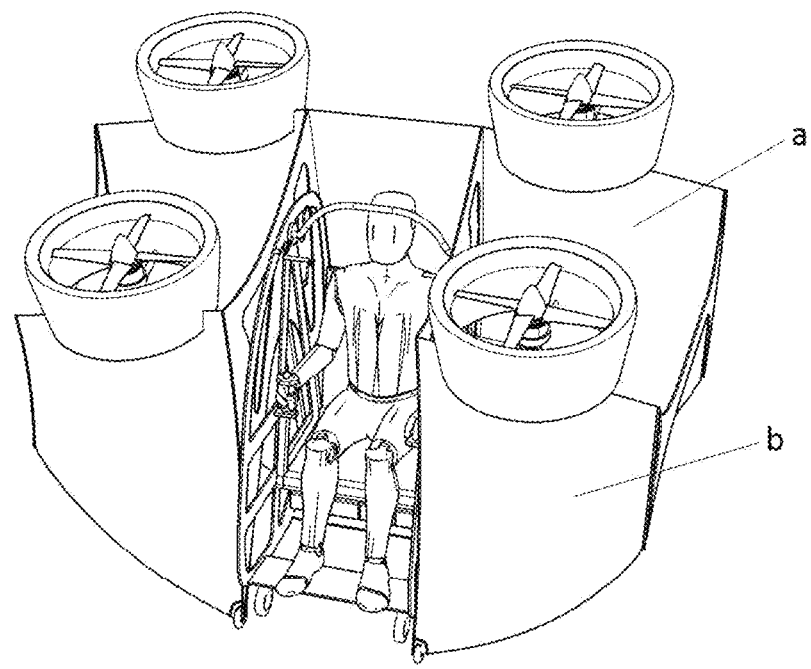
FIG. 4 is an overview of the flight apparatus in the construction version with wing ejectors in the take-off/landing position.
Figure 5:
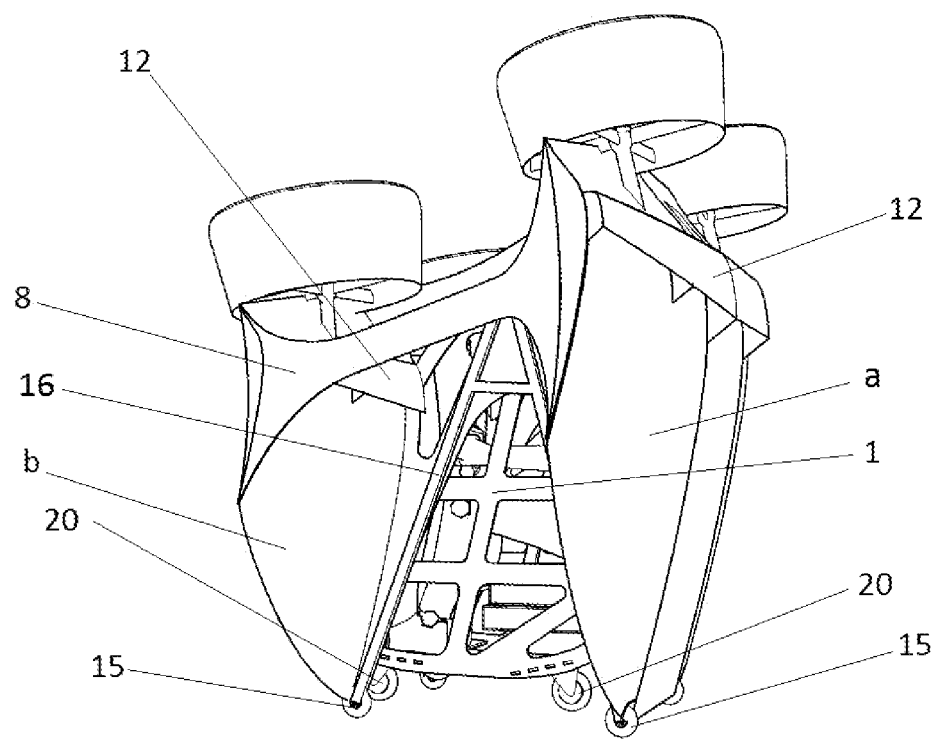
FIG. 5 is a side view in perspective with the flight apparatus in the construction version with wing ejectors in the take-off/landing position.

An overview of a flight apparatus in cruise mode provided with such wing ejectors is illustrated in FIG. 2, and FIG. 3 shows an apparatus not provided with wing ejectors. FIG. 4 shows an overview of the apparatus in a take-off/landing position, and in FIG. 5 is a side view showing the landing gear 15 which is located in the wings extensions. The four wheels of the landing gear 15 can be rotated 360 degrees and are disposed at the ends of the second A-shaped resistance structures 16 which are integral with the central vertical supports 7. To balance the forces developed during the take-off, the axes of the motors may be slightly inclined forward to the perpendicular to the ground, which can be obtained from the corresponding adjustment of the arms of the resistance structure 16.

Figure 6:
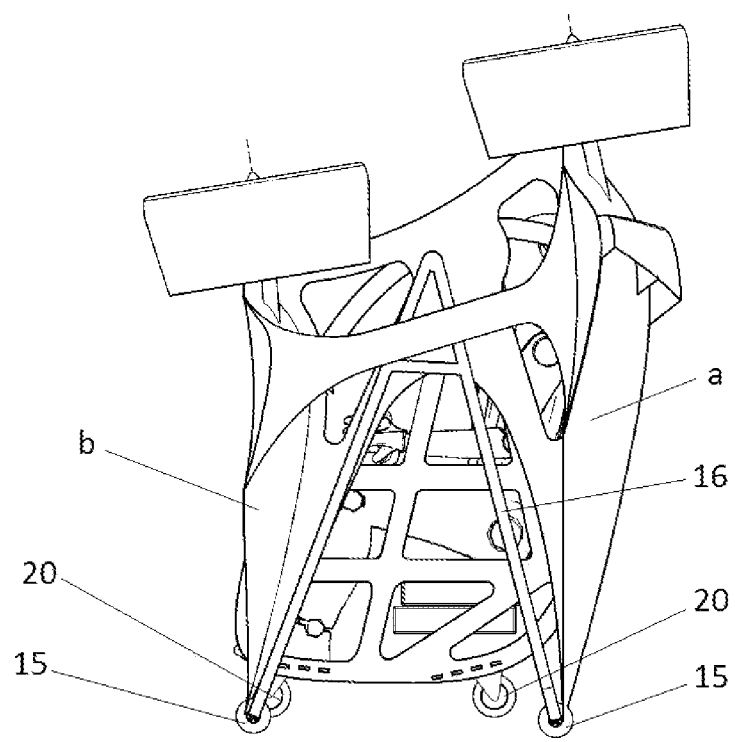
FIG. 6 is a lateral perspective view of the flight apparatus in the construction version with wing ejectors in the take-off/landing position.
Figure 7:
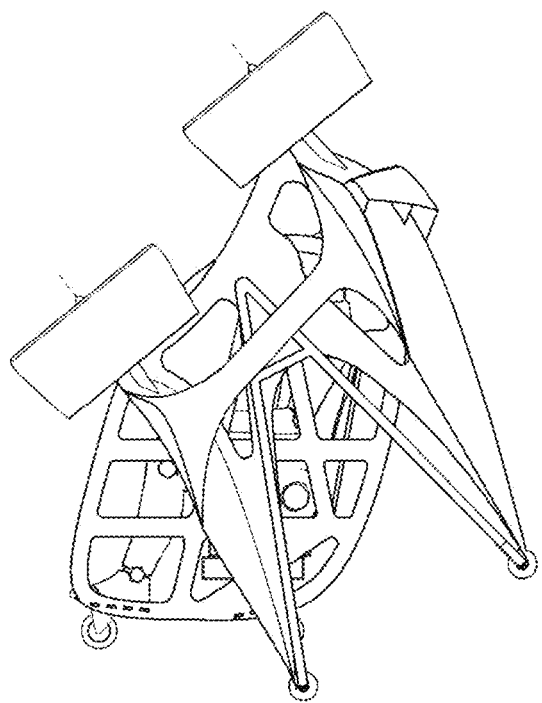
FIG. 7 is a lateral view of the the flight apparatus in the construction version with wing ejectors in the transition mode.
Figure 8:
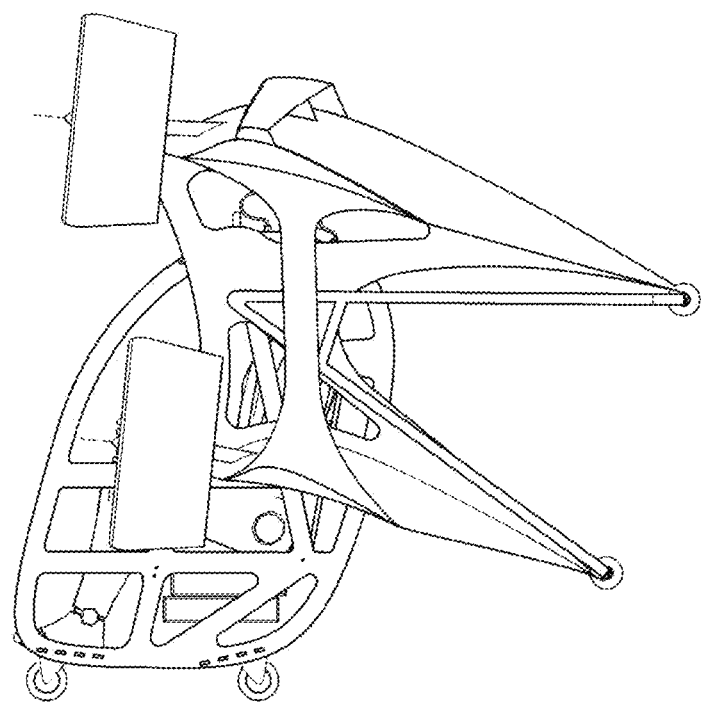
FIG. 8, lateral view of the the flight apparatus in the construction version with wing ejectors in the cruise mode.
Figure 9:
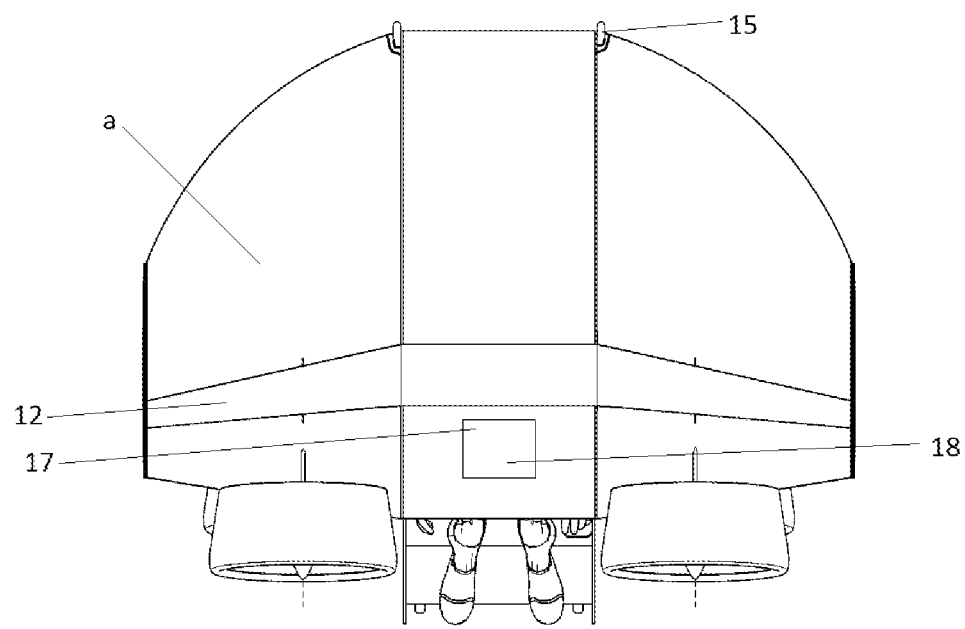
FIG. 9, front view of the flight apparatus in the construction version with wing ejectors in the take-off/landing position.

The flight phases that show how the wings assembly 6 rotates relative to the flight position are as follows: FIG. 6 is a side view of the apparatus in the take-off/landing position; FIG. 7 is a side view of the apparatus in flight transition, and in FIG. 8 a side view with the apparatus during the cruise flight. During the cruise flight mode, the two distinct parts, the cockpit 1 and the wings assembly 6 come into contact by means of the limiting bolt 5, and at this moment, at any lower incidence angle, the two parts act as a unit, the cockpit 1 tilting together with the wings assembly 6. The wings may have an elliptical shape with the straight ends as described in FIG. 9, but they may also have the trapezoidal or rectangular shape.

Figure 10:
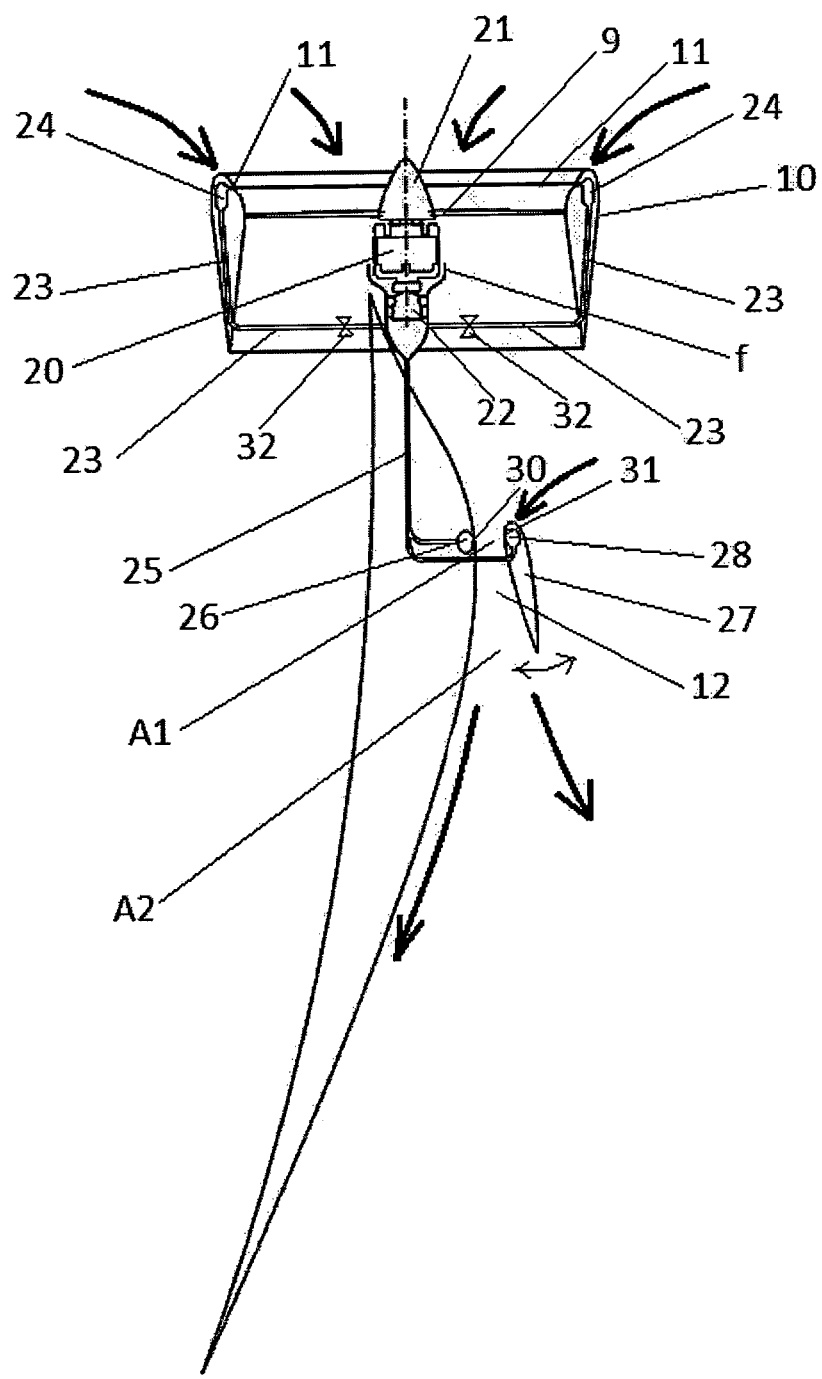
FIG. 10 is a cross-sectional view of a ducted propeller with ejection slit and a wing fitted with a Coanda type ejector and the airflow in the take-off and transition mode.

To take-off in an energy efficient way, it is necessary to drive down a large mass of air at a relatively low speed. In order to accomplish this, it is necessary to perform a synergistic operation of the ducted propellers 9, the annular ejectors slits 11 and the bi-dimensional ejectors 12 disposed on the wings. FIG. 10 illustrates the synergistic operation of the ducted propeller 9 provided with the ejector slit 11 together with the wing ejector 12 and outlines the air flow. In order for all the propulsion elements to function synergistically, the electric motor 20 must transmits its motion not only to the propeller, but also to an air compressor 22, therefore it is preferred that the electric motor 20 shaft has to cross the motor from one head to the other, so that the motor at one end to engage the propeller's rotor 21, and at the other to engage through a speed multiplier the air compressor 22. This air compressor may be axial in order to not have a large section, but also may be centrifugal or even of a Tesla type. The air compressor 22 absorbs the air through a circular slit f which surrounds the electric motor 20, and blows and supplies the compressed air via a pipe 23 towards a pressure annular chamber 24 disposed in the rim of the duct 10, and then from the annular chamber 24, the air is ejected under pressure through the ejection slit 11. Due to this ejection, a depression is formed on the upper part of the duct's lip and thus can draw larger masses of air through the interior of the duct 10. Simultaneously with this compressed air circuit, the air compressor 22 supplies, through the pipe 25, compressed air to the bi-dimensional Coanda ejector 12, which is comprised of a pressure chamber 26 disposed along each wing and which has the ejection slit 30 and the small wing 27 which is disposed all along each wing and which comprises a pressure chamber 28 which has the ejection slit 31. The two pressure chambers 26 and 28 have identical dimensions having a tronconic shape and have maximum cross sections in the central areas of the wings and their sections are shrunk to the wings extremities in order to maintain a pressure as uniform as possible uniform within them.

The two ejection slits 30 and 31 are parallel to one another and the width of their opening is kept constant along them, thus achieving a relatively uniform ejection from one end of the wings to the other. On the length of the ejector, the curvature of the upper side wing is identical to the small wing 27 inner profile. The airfoil of the small wing 27 airfoil has to be rounded on the leading edge this way generating an air depression and drawing a large mass of air. The airflow in the take-off mode is suggested by the arrows represented in FIG. 10. It should also be noted that the ejection slit 30 as well as the curved profile of the upper side of the wing contribute through the Coanda effect to maintain a uniform boundary layer along the upper side of the wing. In more complex constructive variants, the small wing 27 can rotate at a certain angle so that the ejector intake area A1 is diminishing and the ejection area A2 increases and this way the pressure on the upper side can be controlled, thus can be mofified the wings' lift force without varying the flight speed of the flight apparatus or the wings' incidence angle.

Figure 11:
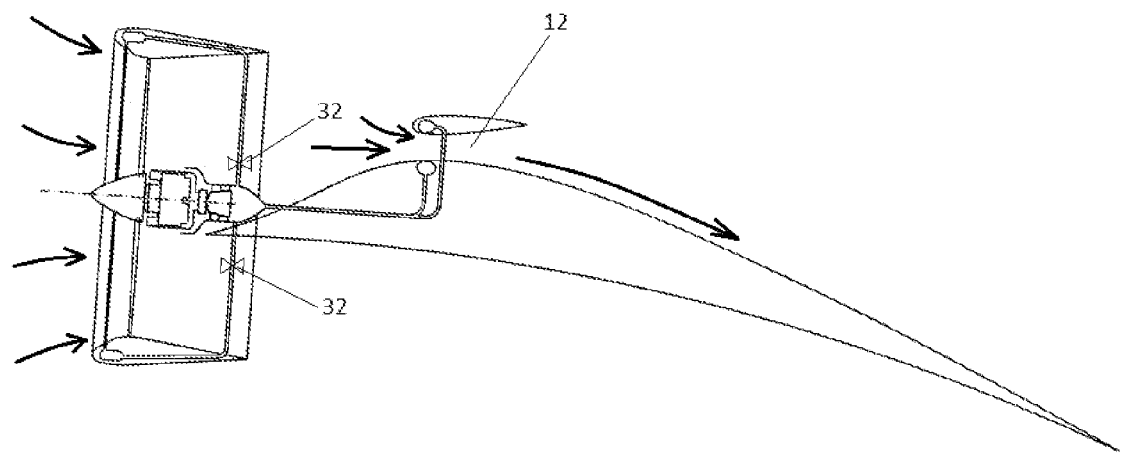
FIG. 11 is a cross-sectional view of a ducted propeller with inlet ejection slit, a wing fitted with a Coanda type ejector and the airflow in the cruise mode.

In order to have an efficient air circulation during the cruise flight, the supply of the compressed air through the pipe 23 to the slits 11 may be interrupted by means of the valves 32 and the supply of compressed air to the slit 28 can be interrupted by means of the valve 33 and the compressed air is distributed only to the slit 30. Thus, through this operation, the air intake zone decreases, the dynamic thrust of the propeller increases as well as the air pressure in the chamber 26, and the masses of air are accelerated synergistically, and the air ejected under pressure through the slit 30 contributes to achieving a uniform boundary layer on the upper side of the wing. In the constructive variant in which the small wing 27 is mobile, it rotates as the ejection area A2 decreases and consequently, the air accelerates inside the ejector contributing to the thrust. The air circulation during the cruise flight is showed by the arrows in FIG. 11.

Figure 12:
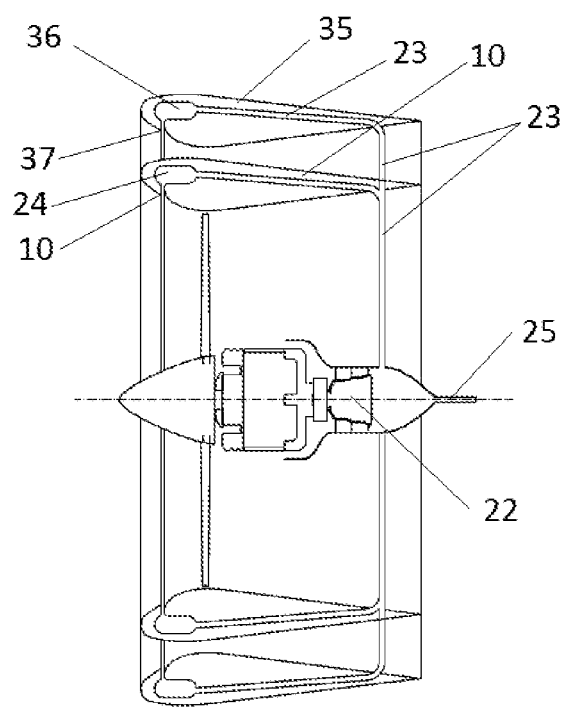
FIG. 12 is a cross-sectional view of a double-flow ducted propeller with inlet ejector.

For longer flight distances, the electric motors 20 can be replaced with heat engines. It is preferable that these motors are Wankel rotary, which have a high power/weight ratio and due to their low cross-section and low vibrations, they are suitable for being ducted. When using heat engines, one of the main drawbacks is the high level of noise. In order to reduce the noise level and at the same time to obtain increased efficiency in the take-off mode, it is possible to achieve a double-flow ducted propeller—FIG. 12. In this case, the duct 10 is doubled outward by another duct 35, which comprises an annular chamber 36 and an ejection slit 37. The required compressed air is provided by an extension of the pipe 23 to the annular chamber 36. The interior of the duct 35 together with the outside part of the duct 10 forms the profile required for a Coanda ejector through which the air is driven and accelerated inward by means of the ejection slit 37.

Figure 13:
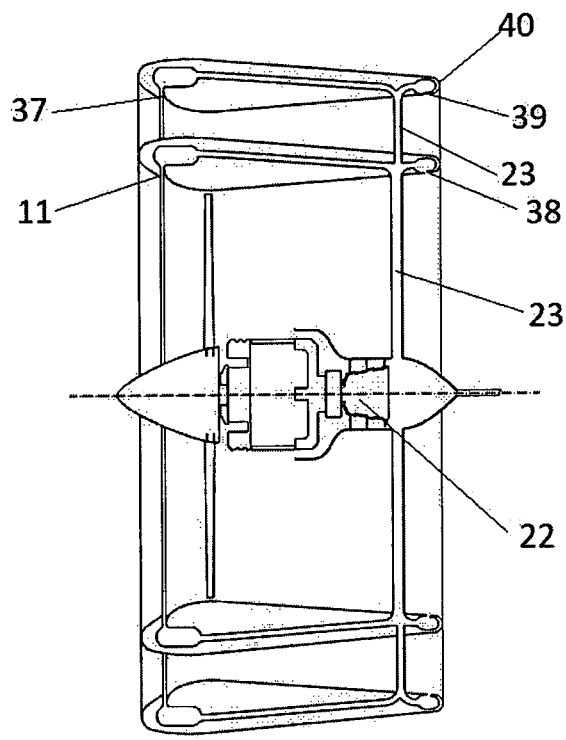
FIG. 13 is a cross-sectional view of a double-flow ducted propeller with inlet ejector and an evacuation ejector.
Figure 14:
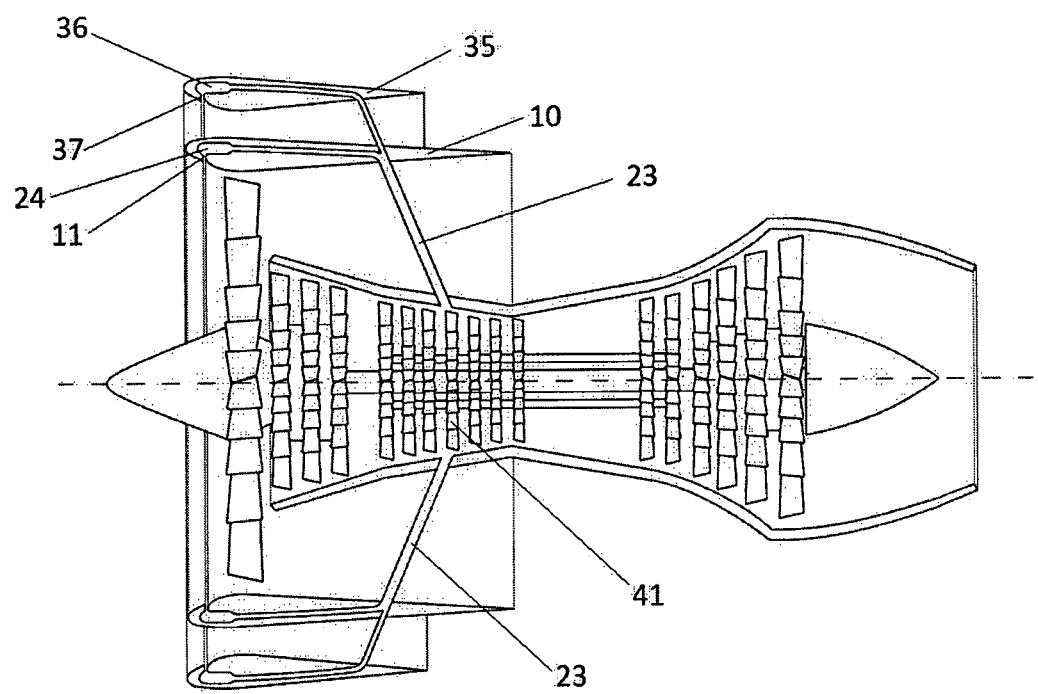
FIG. 14 is a sectional view of a triple-flow jet engine.

In order to have an energy-efficient take-off and landing, the propeller engine must driven large air masses at a relatively slow speed, which implies the need for a large propeller in diameter (as in the case of the helicopter). A solution that leads to a lower section of the propulsion unit, but which has a good take-off/landing efficiency is shown in FIG. 13 which illustrates a double-flow duct propeller that has both ejection slits for intake 11 and 37 as well as for the evacuation, the slits 38 and 39. The corroborated action of the ejection slits 38 and 39, as well as the rounded profiles of the rear parts 40 of the ducts, results in an air ejections also in the lateral sides, thereby increasing the evacuation area cone. Thus, a large mass of air is driven similar to a propeller of a much larger diameter. This concept, which implies the existence of a Coanda type ejector that surrounds the main engine, can be extended to the turbojet engines, and in the case that a Coanda ejector surrounds a turbofan it can be achieved even a triple flow jet engine—FIG. 14. In this case, the pipe 23 takes the necessary compressed air from one stage of the compressor 41 and supplies with it the slits 11 and 37. If necessary, the triple flow jet engine may also be provided with evacuation ejection slits. The advantages of a triple flow jet engine are as follows: it has a greater efficiency for vertical take-offs or classic take-off phases, a more reduced noise and a reduced thermal footprint.

Figure 15:
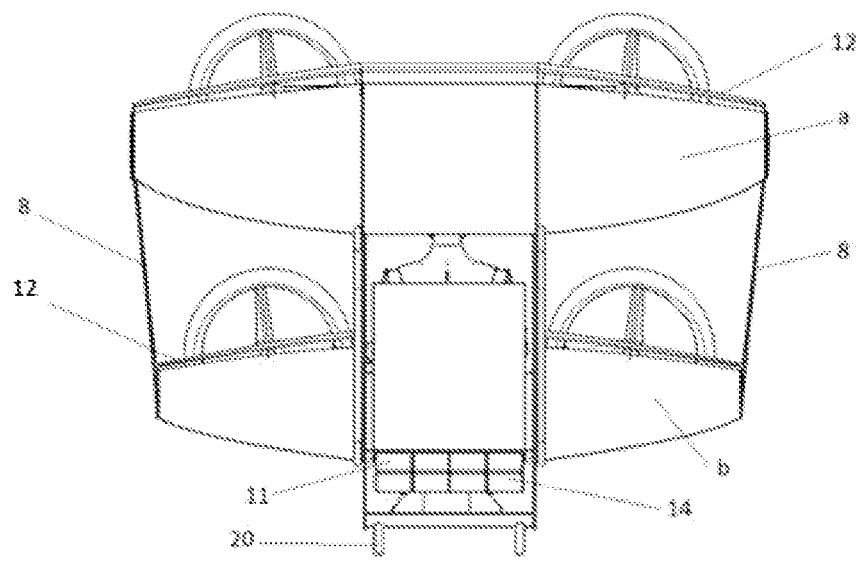
FIG. 15, rear view of the flight apparatus.

FIG. 15 shows a rear view of the flight apparatus in cruise flight, where we can see the arrangement of the batteries under the pilot's seat, which leads to a lower center of gravity and better stability of the flight apparatus. Also in the same place may be disposed the speed regulators of the electric motors.

For the construction variant of the flight apparatus that uses heat engines, instead of the batteries, can be placed the fuel tank.

Figure 16:
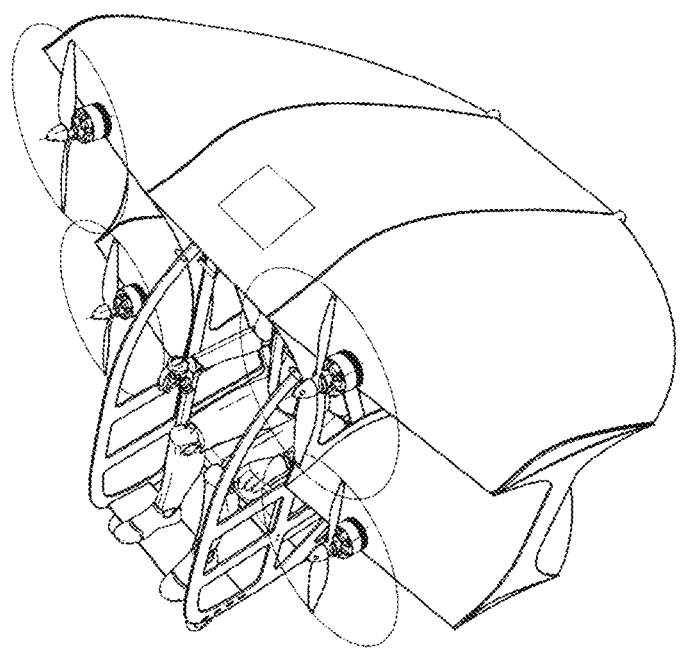
FIG. 16 is an overall view of a flight apparatus with usual propellers without wing ejectors.
Figure 17:
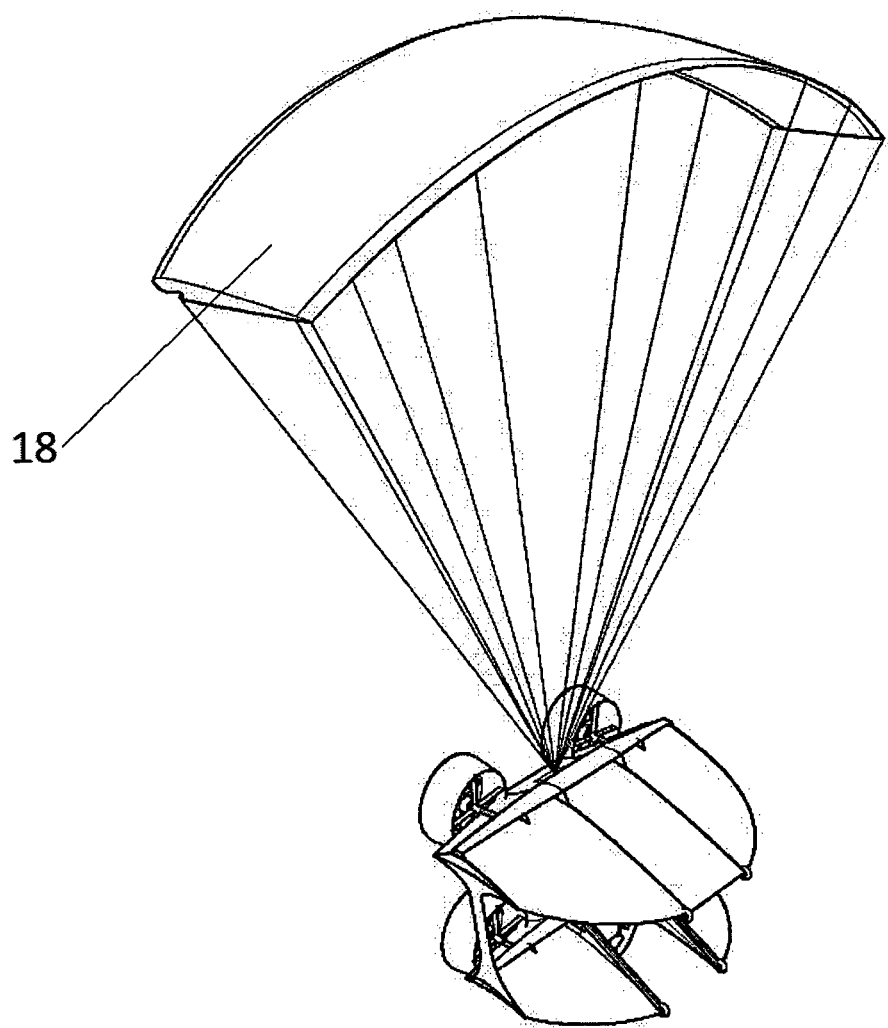
FIG. 17 is a perspective view of the apparatus with an open salvage parachute.

FIG. 16 shows a simpler and less expensive flight apparatus with simple propellers and no ejectors.

In the event that a fault occurs and this makes impossible to continue the flight, the flight apparatus is provided with the rescue parachute 18 which is located in the upper wing of the flight apparatus. It is positioned so that when it is open, it will keep the wings of the flight apparatus at an optimal incidence angle for a landing this way. It is preferable that the parachute to be a rectangular wing type, because after the opening, the pilot can access the parachute controls and this way he can maneuver the flight apparatus in a suitable area for landing. Also, as a further safety measure, the pilot can be equipped with the individual parachute. In the case of a forced landing, the rounded shape of the cockpit's extremities favors the rolling of the flight apparatus which helps to dissipate this way the kinetic energy at the moment of impact with the ground. In the case of breaking one of the joints 3, the lateral frames of the cockpit 1 are attached by cables 19 to the central vertical supports 7 of the wings assembly.

The mode of operation of the flight apparatus is very simple, it flies in quadcopter mode for both take-off and landing mode, but also as well as in the transition and during the cruise flight, and the maneuvers and stabilization mode are known and compliant with this flight concept, thus the existence of other surfaces and additional means of controlling and stabilizing the apparatus is no longer necessary.

What is claimed is:

1. Flight apparatus with vertical take-off and landing, of a biplane type, having two main distinct parts which are articulated between them, a first distinct part consisting of a cockpit hinged to a second distinct part which is a wings assembly; the cockpit being attached to the wings assembly by two hinges fixed in upright central vertical supports of an upper wing and a lower wing b, wherein the upper wing a and the lower wing b are provided with four propellers driven by four electric engines, two of the four propellers being disposed on the upper wing a and two of the four propellers on the lower wing b, the four propellers forming thus a quadcopter layout;

wherein each of the four propellers has a duct;
wherein batteries transmit electric energy to the four electric engines through speed regulators and the batteries are placed under a pilot's seat;
wherein the entire operation of the flight apparatus is managed by means of a flight computer which is disposed in a central part of the upper wing a;
wherein the taking-off is made with the wings a and b and the four electric engines vertically oriented;
wherein the flight apparatus is supported on the ground by means of a landing gear fixed in the extremities of the upper wing a and the lower wing b;
wherein the flight apparatus taking off as a quadcopter and the transition to a cruise flight is made by reducing an angle of incidence of the upper wing a and lower wing b, wherein the angle of incidence decreases naturally due to the increasing drag on the upper wing a and the lower wing b, concurrently with an increasing of the translation speed of the flight apparatus, in the meantime, the cockpit remaining in a vertical orientation due to the cockpit's lower center of gravity and due to the two hinges which allow the cockpit to rotate relative to the wings assembly;
and wherein a landing is made similarly to a quadcopter, slowing down the translation speed in order to lead an increasing of the angle of incidence of the wings a and b until the wings a and b naturally return to the vertical position required for landing, wherein
- the lower wing b is discontinuous and consists of a left side and a right side, which are physically separated by an open space situated between the upright central vertical supports and inner edges of the left and right side of lower wing b, and the cockpit rotates between the left side and right side within the open space of the lower wing b;
- the cockpit has a lower center of gravity relative to the hinges thus determining the cockpit to naturally remain in the vertical orientation in all the phases of flight;
- the hinges are configured to permit the cockpit to rotate with respect to the wings assembly, with a limited arc of rotation of the cockpit; and
- the cockpit's center of gravity naturally shifts forward relative to the wings assembly.

2. Flight apparatus with vertical take-off and landing according to claim 1, wherein the four propellers are double ducted, being provided with a second duct, the second duct being provided on a front side with an ejection slit, thereby forming a double-flow ducted propeller, and wherein an outer side of the first duct and an inner side of the second duct form together an annular Coanda ejector.

3. Flight apparatus according to claim 2, wherein the four electric engines drive, directly or via a speed multiplier, an air compressor which provides compressed air through pipes to an annular chamber, the compressed air being directed to the ejection slits of the Coanda annular ejector.

4. Flight apparatus with vertical take-off and landing, of the biplane type, having two main distinct parts which are articulated between them, a first distinct part consisting of a cockpit hinged to a second distinct part which is a wings assembly comprising two wings in a biplane type configuration and upright central vertical supports joining the two wings; the cockpit being attached to the wings assembly by two hinges fixed in the upright central vertical supports, the two wings are provided with four triple flow jet engines, wherein a flight computer which manages the entire operation of the apparatus is disposed in a central part of the upper wing a and a landing gear is fixed in the wing extremities, the landing gear being adapted to support the apparatus on the ground; and wherein
- each triple flow jet engine is made up of a classic double flow turbofan engine which has a first duct which surrounds the turbofan's fan, the first duct being surrounded by a second duct provided on an inlet lip with an annular ejection slit; wherein the inner part of the second duct, together with the outer part of the first duct, forms an annular Coanda ejector;
- compressed air is taken from the compression stages of the double flow jet engine to feed the annular Coanda ejector which surrounds the double flow turbojet turbofan adding a third concentric engine jet;
- the first flow is the central one and it is generated by the inner turbojet of the turbofan; the second flow is generated by the fan of the turbofan located in front of the inner turbojet and generates an annular flow that surrounds the turbojet and the third flow is generated by the Coanda annular ejector that surrounds the turbofan;
- the compressed air required for the operation of the ejection slit is supplied through pipes from a stage of the turbofan's compressor, the four triple flow jet engines being disposed two on the upper wing and two on the lower wing, the four engines forming thus a quadcopter layout;
- the lower wing is discontinuous and consists of a left side and a right side, which are physically separated by an open space situated between the upright central vertical supports and inner edges of the left and right side of the lower wing, and the cockpit rotates between the left side and right side within the open space of the lower wing;
- the cockpit has a lower center of gravity relative to the hinges thus determining the cockpit to naturally remain in a vertical orientation in all the phases of flight;
- the hinges are configured to permit the cockpit to rotate with respect to the wings assembly with a limited arc of rotation of the cockpit; and
- the cockpit's center of gravity naturally shifts forward relative to the wings assembly.

* * * * *